United States Patent
Shah et al.

(10) Patent No.: US 11,194,758 B1
(45) Date of Patent: Dec. 7, 2021

(54) DATA ARCHIVING USING A COMPUTE EFFICIENT FORMAT IN A SERVICE PROVIDER ENVIRONMENT

(71) Applicant: Amazon Technologies, Inc., Seattle, WA (US)

(72) Inventors: Pallav Milankumar Shah, Ahmedabad (IN); Lakshay Virmani, New Delhi (IN); Tej Paul Verma, Hyderabad (IN); Mukesh Bhangria, Hyderabad (IN); Jaya Talreja, Indore (IN)

(73) Assignee: Amazon Technologies, Inc., Seattle, WA (US)

( * ) Notice: Subject to any disclaimer, the term of this patent is extended or adjusted under 35 U.S.C. 154(b) by 413 days.

(21) Appl. No.: 16/238,430

(22) Filed: Jan. 2, 2019

(51) Int. Cl.
G06F 16/11 (2019.01)
G06F 16/2455 (2019.01)
G06F 16/22 (2019.01)

(52) U.S. Cl.
CPC .......... G06F 16/113 (2019.01); G06F 16/122 (2019.01); G06F 16/2272 (2019.01); G06F 16/24562 (2019.01)

(58) Field of Classification Search
CPC .............................. G06F 16/113; G06F 16/122
See application file for complete search history.

(56) References Cited

U.S. PATENT DOCUMENTS

| | | | | |
|---|---|---|---|---|
| 9,998,537 | B1* | 6/2018 | O'Connell | G06F 11/1451 |
| 2003/0061456 | A1* | 3/2003 | Ofek | G06F 11/1448 |
| | | | | 711/162 |
| 2007/0100913 | A1* | 5/2007 | Sumner | G06F 11/1453 |
| 2008/0229037 | A1* | 9/2008 | Bunte | G06F 16/113 |
| | | | | 711/162 |
| 2011/0055559 | A1* | 3/2011 | Li | H04L 9/0894 |
| | | | | 713/165 |
| 2011/0196829 | A1* | 8/2011 | Vickrey | G06F 16/275 |
| | | | | 707/622 |
| 2012/0084524 | A1* | 4/2012 | Gokhale | G06F 11/1451 |
| | | | | 711/162 |
| 2012/0212850 | A1* | 8/2012 | Haustein | G11B 27/11 |
| | | | | 360/39 |
| 2013/0238563 | A1* | 9/2013 | Amarendran | G06F 16/21 |
| | | | | 707/654 |
| 2016/0004721 | A1* | 1/2016 | Iyer | G06F 16/184 |
| | | | | 707/649 |
| 2016/0210306 | A1* | 7/2016 | Kumarasamy | G06F 16/178 |
| 2016/0328176 | A1* | 11/2016 | Chiu | G06F 3/0685 |
| 2019/0073275 | A1* | 3/2019 | Sarafijanovic | G06F 3/0649 |
| 2019/0129799 | A1* | 5/2019 | Kumarasamy | G06F 11/1451 |

* cited by examiner

*Primary Examiner* — Dennis Truong
(74) *Attorney, Agent, or Firm* — Robert C. Kowert; Kowert, Hood, Munyon, Rankin & Goetzel, P.C.

(57) ABSTRACT

Technology is described for data archiving in a service provider environment. A first archive data package may be received from an archival data store in the service provider environment. The first archive data package may include first data blocks and first key block data. Second data blocks and second key block data may be received from a source data store in the service provider environment. Merged data blocks may be created by combining the first data blocks with the second data blocks. The merged data blocks may be sent to the archival data store while merged key block data is being created. The merged data blocks and the merged key block data may be included in a second archive data package that is stored at the archival data store.

20 Claims, 10 Drawing Sheets

US 11,194,758 B1

DATA ARCHIVING USING A COMPUTE EFFICIENT FORMAT IN A SERVICE PROVIDER ENVIRONMENT

BACKGROUND

Data archiving may involve moving data that is not actively accessed to a separate data store. Archive data may include data that is retained for regulatory compliance or data that is accessed occasionally (e.g., every few weeks or months) by an organization, as opposed to a more frequent (e.g., daily) basis. Data may be archived to reduce storage costs for a customer. For example, data that is accessed more frequently by the customer may be stored in a high-performance data store with increased read/write capabilities, thereby making the data more expensive to store. On the other hand, archive storage may utilize a low-performance, high-capacity data store, thereby providing cost savings to the customer.

In one example, data archiving may be automatically performed with data that is stored in a service provider environment. For example, a customer may store data in a low-latency, high-cost data store in the service provider environment. The customer may access the data stored in the low-latency, high-cost data store on a frequent basis, but some of the data may be accessed less often. When the customer's data has not been accessed from the low-latency, high-cost data store for a certain period of time (e.g., 30 or 60 days), that data may be automatically migrated to a high-latency, low-cost data store, which can provide cost savings to the customer.

DETAILED DESCRIPTION

Figure 1:
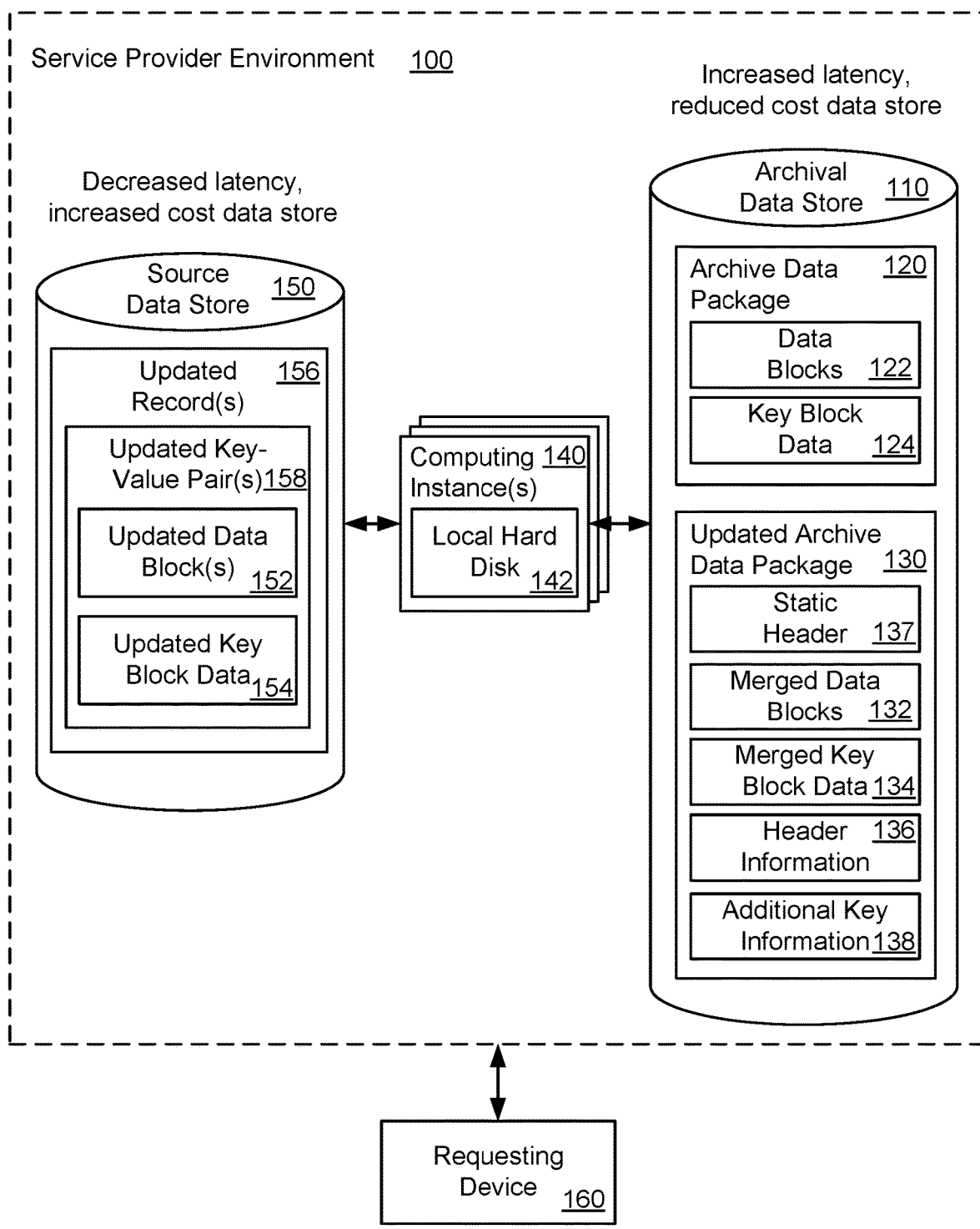
FIG. 1 illustrates a system and related operations for archiving data in a service provider environment according to an example of the present technology.

Technologies are described for data archiving in a service provider environment. An archive data package associated with a customer may be stored in an archival data store (e.g., an increased latency and reduced cost data store). As a non-limiting example, the archive data package may be a read-only database (RODB) file that includes a plurality of key-value pairs. The customer may also have data stored in a source data store that is active (e.g., a reduced latency and increased cost data store), and that data may generally be accessed more often by the customer. However, when data in the source data store has not been accessed by the customer for a certain period of time (e.g., 30 days), the data may be moved from the source data store to the archival data store to reduce storage costs for the customer.

In order to move or transfer the data, the archive data package associated with the customer may be downloaded from the archival data store to a computing instance in the service provider environment, and data blocks to be added (e.g., data that has not been accessed for the certain period of time) may be merged with existing data blocks in the archive data package.

The data blocks may be merged together in parallel with merged data blocks being transmitted to the archival data store (e.g., an object data store) to utilize compute power and network bandwidth at one time, and without storing the data block onto a local hard disk of the computing instance to reduce a number of read and write operations to relatively slow local storage. For example, while data blocks are being merged together, merged data blocks may be transmitted to the archival data store (while other merged data blocks are still being formed), thereby utilizing compute power and network bandwidth at a same time. In one particular example, the data blocks may be formed and sent to the archival data store as a data stream, and without writing the formed data blocks to the local hard disk or other comparatively slow mass storage of the computing instance. The computing instance may transmit key information and header information to the archival data store after the data blocks have been transmitted to the archival data store. The transmitted data blocks, the key information and the header information may form an updated archive data package for the customer, which may be stored in the archival data store or object data store.

In one configuration, components of the updated archive data package may be created and transmitted from the computing instance to the archival data store. For example, merged data blocks may be formed in parallel with being transmitted to the archival data store (e.g., as a data stream). Since the key information and/or the header information are dependent on the merged data blocks (e.g., the header information may be computed based on the merged data blocks), the key information and the header information may be computed and transmitted to the archival data store after the merged data blocks are transmitted to the archival data store.

In a previous data archive solution, the archive data package would be downloaded to the computing instance. During the download, network bandwidth would be consumed while a compute capacity of the computing instance would be idle. After the archive data package was downloaded, data blocks would be merged together, at which time the network bandwidth would not be consumed whereas the compute capacity would be consumed. After the data blocks were merged and key information and header information were computed, an updated archive data package (e.g., a single file) would be generated at the computing instance to include the merged data blocks, the key information and the header information. The updated archive data package would be uploaded to the archival data store, at which time the network bandwidth would be consumed while the compute capacity of the computing instance would be idle. Therefore, previous data archive solutions tended to be inefficient in terms of network bandwidth and compute utilization.

Moreover, in the previous data archive solutions, the key information and the header information were computed after the data blocks were merged, so the data blocks were stored onto the local hard disk of the computing instance or another slower mass storage device during the data archive process. The storage of the data blocks resulted in an increased number of read and write operations on the local hard disk of the computing instance and slower overall performance.

In the present technology, data blocks may be merged together and transmitted to the archival data store in parallel to utilize compute power and network bandwidth at a same time. Rather than generating the updated archive data package as a single file and sending the updated archive data package to the archival data store, components of the updated archive data package may be created and separately transmitted to the archival data store. For example, merged data blocks may be transmitted separate from (and prior to the transmission of) the key information and the header information (e.g., the merged data blocks may be transmitted before the key information and the header information are transmitted). The separate transmissions of the components of the updated archive data package may eliminate storage of the merged data blocks onto the local hard disk of the computing instance. In one example, the merged data blocks may be approximately 90-99% of a file size of the updated archive data package. Therefore, transmitting the merged data blocks upon creation and prior to transmission of header material may reduce an amount of time taken to provide the updated archive data package to the archival data store.

FIG. 1 illustrates an example of a system and related operations for archiving data in a service provider environment 100. The data archival process may involve moving data that is not accessed for a defined period of time (e.g., three weeks) from a source data store 150 to an archival data store 110 using a computing instance 140 that executes in the service provider environment 100. The archival data store 110 may be an increased latency and a reduced cost data store. The archival data store 110 may be an object data store in the service provider environment. The source data store 150 may be a decreased latency and an increased cost data store. The source data store 150 may be a No Structured Query Language (NoSQL) non-relational data store or a relational data store.

In one example, "latency" may refer to a period of time (or time delay) between when (A) a request of data is received (e.g., by the service provider environment 100) or made by a requesting device 160, and (B) a response to the request is generated or sent (e.g., generated by the service provider environment 100 or sent to the requesting device) 160, which may be limited by the ability of the hardware/software to receive/access the data and generate the response.

In one example, the archival data store 110 may be associated with a first latency and the source data store 150 may be associated with a second latency that is less than the first latency. In other words, the archival data store 110 may have a greater latency as compared to the source data store 150. In another example, the archival data store 100 may have an increased latency, which may be defined in relation to a first threshold, and the source data store 150 may have a decreased latency, which may be defined in relation to a second threshold. The first threshold and the second threshold may change over time based on conditions in the service provider environment 100. For example, during certain points in time, a latency of the source data store 150 may be higher than a latency of the archival data store 110 (e.g., when the source data store 150 is receiving an increased number of transactions at a same time). In another example, the first threshold and the second threshold may be user configurable through a user interface.

In one example, the computing instance 140 may initiate a data archive process for a customer, in which data that has not been accessed by the customer for the defined period of time (e.g., three weeks) may be moved to the archival data store 110 from the source data store 150. For example, data may be stored for the customer in the source data store 150. The data stored in the source data store 150 may generally be accessed on a regular basis (e.g., daily) by the customer. However, when the data has not been accessed by the customer for the defined period of time, the computing instance 140 may initiate the data archive process to move the data from the source data store 150 to the archival data store 110.

In one example, the customer may already have archive data stored in the archival data store 110. For example, the customer may have an archive data package 120 stored in the archival data store 110. In this case, the computing instance 140 may merge the data that has not been accessed for the defined period of time with the existing archive data package 120 to create an updated archive data package 130. In other words, the updated archive data package 130 may be a newer version of the existing archive data package 120. On the other hand, when the data does not already have archive data stored in the archival data store 110, the computing instance 140 may send the data that has not been accessed for the defined period of time to the archival data store 110, and that data may form the archive data package 120 to be stored for the customer on the archival data store 110.

In one example, the archive data package 120 may be a read-only database (RODB) file that includes a plurality of key-value pairs. The RODB file may support various types of read operations. For example, the RODB file may support a random get operation, which given a key, may return a value of that key from the RODB file. The random get operation may be used for lookups of specific keys in a random order. The RODB file may also support a cursor set/get operation, which may return a next key/value pair in the RODB file. The cursor set/get operation may be used for lookups of sequential key/value pairs that exist in the RODB file.

In one configuration, when the data archive process has been initiated to create the updated archive data package 130 as an update to the archive data package 120, the computing instance 140 may receive the archive data package 120 from the archival data store 110. The computing instance 140 may store the archive data package 120 in a local hard disk 142 of the computing instance 140. The archive data package 120 may include data blocks 122 and key block data 124. More specifically, the archive data package 120 may comprise record(s) that include the plurality of key-value pairs, and keys from the key-value pairs may be included in the key block data 124 and values from the key-value pairs may be included in the data blocks 122.

The computing instance 140 may also receive updated data blocks 152 and updated key block data 154 from the source data store 150. The updated data blocks 152 and the updated key block data 154 may be associated with updated records 156 that are stored in the source data store 150. For example, the updated records 156 may include a plurality of updated key-value pairs 158. Keys in the updated key-value pairs 158 may correspond to the updated key block data 154, and values in the updated key-value pairs 158 may correspond to the updated data blocks 152. The updated data blocks 152 and the updated key block data 154 may correspond to the source data which has not been accessed for the defined period of time. In other words, the non-accessed source data may be considered as an update to the archive data package 120 that is already stored in the archival data store 110.

In one example, the computing instance 140 may merge the data blocks 122 received from the archival data store 110 with the updated data blocks 152 received from the source data store 150 to create merged data blocks 132. The computing instance 140 may send the merged data blocks 132 to the archival data store 110. More specifically, the computing instance 140 may create merged data blocks 132 in parallel with sending merged data blocks 132 in order to utilize compute power at the computing instance 140 and network bandwidth at a same time, and reduce an amount of time to complete the data archive process. The merging of the data blocks 122 with the updated data blocks 152 may involve updating previous values and adding new values. In one example, the merged data blocks 132 may be created and sent to the archival data store 110 as a data stream, and without storing the merged data blocks 132 in the local hard disk 142 of the computing instance 140, thereby reducing the number of read and write operations performed on the local hard disk 142 of the computing instance 140.

In one example, the computing instance 140 may send the merged data blocks 132 while merged key block data 134 and header information 136 are being computed at the computing instance 140. For example, while the merged data blocks 132 are being created and sent to the archival data store 110, the computing instance 140 may merge the key block data 124 received from the archival data store 110 with the updated key block data 154 received from the source data store 150 to compute the merged key block data 134. In addition, the computing instance 140 may compute the header information 136 based on the merged data blocks 132. The merging of the key block data 124 with the updated key block data 154 may involve updating previous keys and adding new keys.

In one configuration, the computing instance 140 may receive the archive data package 120 that includes the data blocks 122 from the archival data store 110. While the archive data package 120 is being received, the computing instance 140 may begin to merge the received data blocks 122 with the updated data blocks 152 received from the source data store 150. Therefore, the merged data blocks 132 may be created while the archive data package 120 that includes the data blocks 122 is being downloaded from the archival data store 110, thereby improving network bandwidth and compute utilization at the computing instance 140.

In one example, the computing instance 140 may send the merged key block data 134 and the header information 136 to the archival data store 110. Since the merged key block data 134 and/or the header information 136 are computed based on the merged data blocks 132, the computing instance 140 may send the merged key block data 134 and the header information 136 to the archival data store 110 after the merged data blocks 132 are sent to the archival data store 110. For example, the header information 136 may include offset information, which may be computed based on the merged data blocks 132 and/or the merged key block data 134. The merged key block data 134 and the header information 136 may be stored on the local hard disk 142 of the computing instance 140 during creation and while the merged data blocks 132 are being transmitted to the archival data store 110, whereas the merged data blocks 132 may not be stored on the local hard disk 142.

In one configuration, the computing instance 140 may send a static header 137 to the archival data store 110, which may indicate that offset information for various regions in the updated archive data package 130 (e.g., the merged data blocks 132, the merged key block data 134) is located at an end of the updated archive data package 130. The computing instance 140 may send the static header 137 to the archival data store 110 prior to sending the merged data blocks 132 to the archival data store 110, which may enable the merged data blocks 132 to be stored by the archival data store 110. The computing instance 140 may also send additional key information 138 to the archival data store 110, which may include a key block pointer table and a key block string table. The key block pointer table and a key block string table may include information related to prefixes and suffixes of the keys, which may be a more efficient mechanism than storing whole keys.

In one example, the merged data blocks 132, the merged key block data 134, the header information 136, the static header 137 and the additional key information 138 may be included as components in the updated archive data package 130 that is stored in the first data store 130. The updated archive data package 130 may include a plurality of key-value pairs, and keys from the key-value pairs may be included in the merged key block data 134 and values from the key-value pairs may be included in the merged data blocks 132. In addition, the updated archive data package 130 may be an update or replacement of the archive data package 120. Therefore, the archive data package 120 may be deleted from the archival data store 110 after the updated archive data package 130 is uploaded to the archival data store 110.

In one example, the merged data blocks 132 may be written to the updated archive data package 130 prior to writing the merged key block data 134, the header information 136, and the additional key information 138 to the updated archive data package 130, but after writing the static header 137 to the updated archive data package 130. In other words, since the merged data blocks 132 are transmitted earlier in time as compared to the merged key block data 134, the header information 136, and the additional key information 138, the merged data blocks 132 may be stored as part of the updated archive data package 130 prior to storing the merged key block data 134, the header information 136, and the additional key information 138 as part of the updated archive data package 130.

In one configuration, the components of the updated archive data package 130 (e.g., the merged data blocks 132, merged key block data 134, header information 136, static header 137 and additional key information 138) may be separately transmitted from the computing instance 140 to the archival data store 110. During the data archive process, the components may be separately transmitted from the computing instance 140 to the archival data store 110 with a specific ordering to maximize network bandwidth and compute utilization at the computing instance 140, as well as reduce an amount of time to create the updated archive data package 130. For example, the computing instance 140 may first send the static header 137 to the archival data store 110, which may enable the merged data blocks 132 to be stored at the archival data store 110. Second, the computing instance 140 may send the merged data blocks 132 to the archival data store 110. The merged data blocks 132 may form 90-99% of a file size of the updated archive data package 130, so the ability to send the merged data blocks 132 in parallel with the creation of the merged data blocks 132 may reduce an amount of time taken to create the updated archive data package 130. Third, the computing instance 140 may send the additional key information 138 (e.g., the key block pointer table and the key block string table) to the archival data store 110. Fourth, the computing instance 140 may send the merged key block data 134 to the archival data store 110. Fifth, the computing instance 140 may send the header information 136 that includes the offset information to the archival data store 110.

Figure 2:
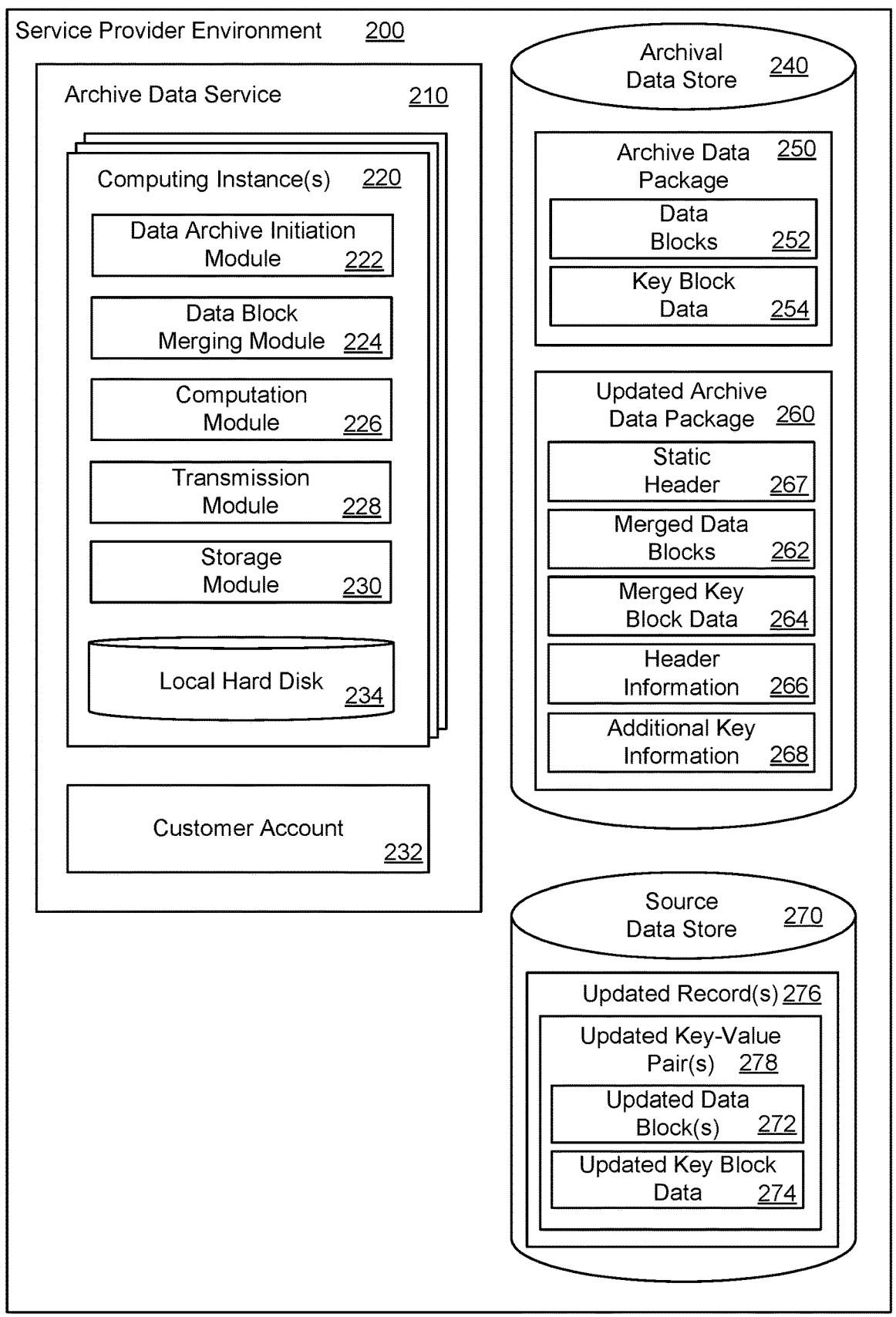
FIG. 2 is an illustration of a networked system for archiving data in a service provider environment according to an example of the present technology.

FIG. 2 illustrates example components of the present technology in a service provider environment 200. The service provider environment 200 may operate an archive data service 210. The archive data service 210 may utilize one or more computing instances 220 to provide an updated archive data package 260 to an archival data store 240 in the service provider environment 200. The computing instance (s) 220 may provide the updated archive data package 260 during a data archive process. The data archiving process may be performed for data associated with a customer account 232. For example, the computing instance(s) 220 may receive an archive data package 250 associated with the customer account 232 from the archival data store 240. The archival data store 240 may be an increased latency and a reduced cost data store. The archive data package 250 may include data blocks 252 and key block data 254. The computing instance(s) may receive updated data blocks 272 and updated key block data 274 from a source data store 270 in the service provider environment 200. The source data store 270 may be a reduced latency and an increased cost data store. In one example, the reduced/increased costs of the data stores may refer to financial costs and/or computational resource costs, and the costs may be configurable or dynamic in nature. The updated data blocks 272 and the updated key block data 274 may be associated with updated records 276 that are stored in the source data store 270. For example, the updated records 276 may include a plurality of updated key-value pairs 278. Keys in the updated key-value pairs 278 may correspond to the updated key block data 274, and values in the updated key-value pairs 278 may correspond to the updated data blocks 272.

In one example, the computing instance(s) 220 may create merged data blocks 262 by combining the data blocks 252 with the updated data blocks 272. The computing instance(s) 220 may send the merged data blocks 262 to the archival data store 240 while merged key block data 264 and header information 266 are being computed. The merged key block data 264 and the header information 266 may be sent to the archival data store 240 after sending the merged data blocks 262. The merged data blocks 262, the merged key block data 264 and the header information 266 may be included in the updated archive data package 260 that is stored at the archival data store 240.

The archival data store 240 may include the archive data package 250, which may include the data blocks 252 and the key block data 254. The archive data package 250 may include data that is infrequently accessed by the customer account 232 (e.g., every few months or years). The archive data package 250 may be a read-only database (RODB) file that comprises record(s) which include a plurality of key-value pairs. Keys from the key-value pairs may be included in the key block data 254 and values from the key-value pairs may be included in the data blocks 252.

The archival data store 240 may include the updated archive data package 260, which may include the merged data blocks 262, the merged key block data 264, header information 266, a static header 267 (e.g., which may include a file size) and additional key information 268 (which may include a key block pointer table and a key block string table). The updated archive data package 260 may serve to replace the archive data package 250. In other words, the updated archive data package 260 may be a newer version of the archive data package 250. The updated archive data package 260 may be a RODB file that includes a plurality of key-value pairs, similar to the archive data package 250.

The source data store 270 may include the updated data blocks 272 and the updated key block data 274. The updated data blocks 272 and the updated key block data 274 may correspond to data that has not been accessed for a defined period of time (e.g., 5 weeks) by the customer account 232. Once the data in the source data store 270 has not been accessed for the defined period of time, that data may become the updated data blocks 272 and the updated key block data 274.

The computing instance(s) 220 operated by the archive data service 210 may utilize a number of modules for providing the updated archive data package 260 to the archival data store 240 in the service provider environment 200. For example, the computing instance(s) 220 may include a data archive initiation module 222, a data block merging module 224, a computation module 226, a transmission module 228, a storage module 230, and other applications, services, processes, systems, engines, or functionality not discussed in detail herein.

The data archive initiation module 222 may initiate the data archive process during which data that is infrequently accessed may be moved to the archival data store 240 from the source data store 270. For example, the data archive initiation module 222 may detect when data stored in the source data store 270 has not been accessed for the defined period of time, and then initiate the data archive process to move that data to the archival data store 240. The data archive process may involve updating the archive data package 250 that is already stored in the archival data store 240 to include the less accessed data from the source data store 270.

The data block merging module 224 may receive the archive data package 250 from the archival data store 240, and the archive data package 250 may include the data blocks 252 and the key block data 254. The data block merging module 224 may receive the updated data blocks 272 and the updated key block data 274 from the source data store 270. The data block merging module 224 may merge the data blocks 252 with the updated data blocks 272 in memory of the computing instance to create the merged data blocks 262. The data block merging module 224 may create the merged data blocks 262 by updating previous values and adding new values.

The computation module 226 may compute the merged key block data 264 and the header information 266. The computation module 226 may compute the merged key block data 264 by merging the key block data 254 with the updated key block data 274. The computation module 226 may compute the header information 266, which may include offset information, based on the merged data blocks 262 and/or the merged key block data 264. The computation module 226 may compute the merged key block data 264 by updating previous keys and adding new keys. In addition, the computation module 226 may compute the header information 266 and the additional key information 268.

The transmission module 228 may send the merged data blocks 262 to the archival data store 240. In a particular example, the transmission module 228 may send the merged data blocks 262 as a data stream. The transmission module 228 may initially send the merged data blocks 262 to the archival data store 240, and then send the merged key block data 264 and the header information 266 to the archival data store 240. In a specific example, the transmission module 228 may send the merged data blocks 262 while a remainder of the archive data package 250, the updated data blocks 272 and/or the updated key block data 274 is being received by the transmission module 228. In addition, after sending the merged data blocks 262 to the archival data store 240, the transmission module 228 may send the static header 267 and the additional key information 268.

The storage module 230 may store the archive data package 250 received from the archival data store 240 in a local hard disk 234 of the computing instance 220. The storage module 230 may store the merged key block data 264, the header information 266, and the additional key information 268 in the local hard disk 234 of the computing instance 220. However, the storage module 230 may not store the merged data blocks 262 in the local hard disk 234 of the computing instance 220, thereby reducing the number of read and write operations performed on the local hard disk 234 of the computing instance 220. The merged data blocks 262 may be created and transmitted using the computing instance 220 without storage of the merged data blocks 262 on the local hard disk 234 of the computing instance 220.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

A network may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
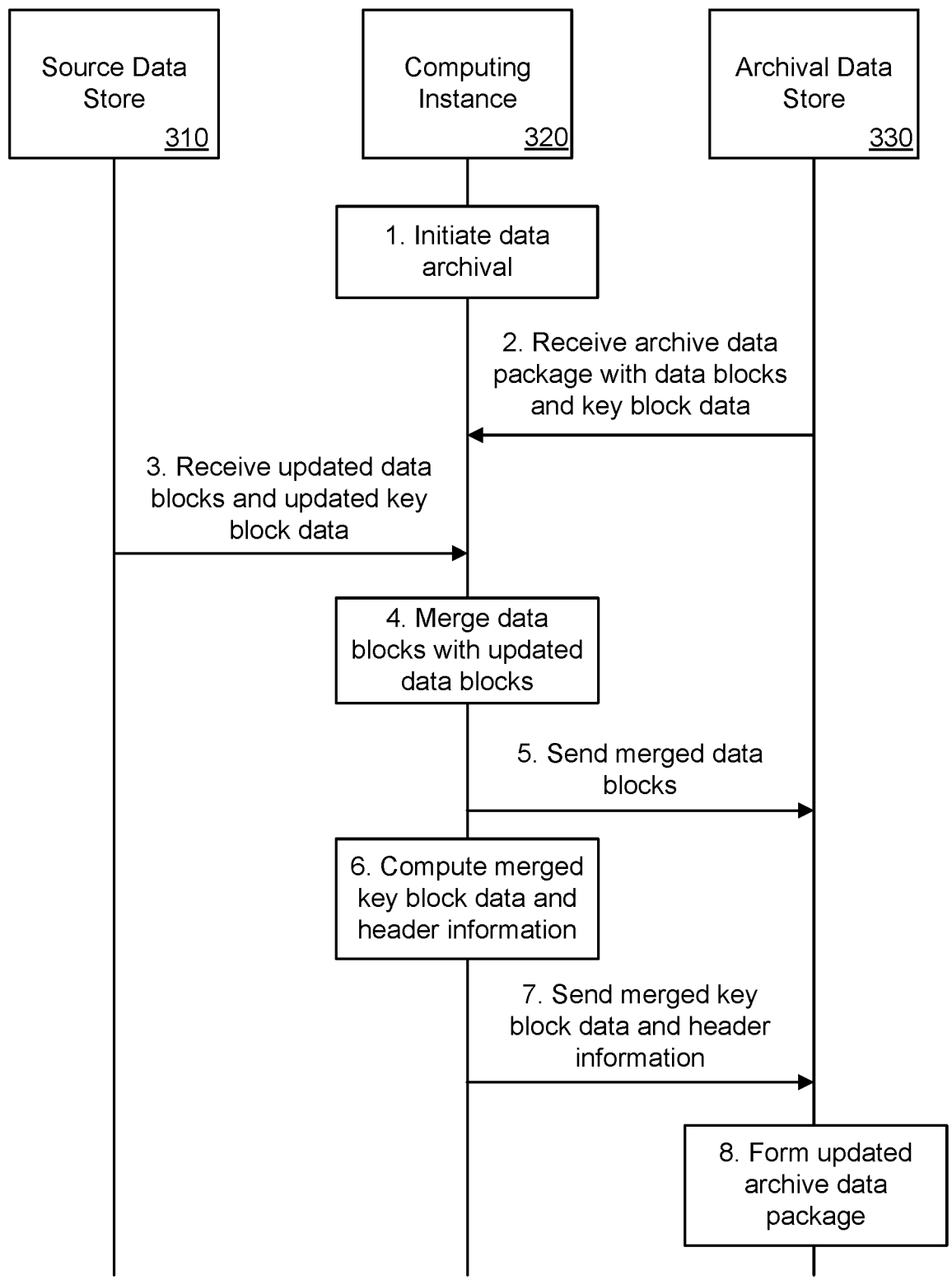
FIG. 3 illustrates operations for generating an updated archive data package in a service provider environment according to an example of the present technology.

FIG. 3 illustrates an example of operations for generating an updated archive data package in a service provider environment. The updated archive data package may be generated using a computing instance 320 running in a service provider environment. In a first action, the computing instance 320 may initiate a data archive process. For example, the computing instance 320 may detect that data stored for a customer in a source data store 310 (e.g., a low latency, high cost data store) has not been accessed for a defined period of time (e.g., 30 days), and thereby, that data is to be moved to an archival data store 330 (e.g., a high latency, low cost data store). In a second action, the computing instance 320 may receive an archive data package associated with the customer from the archival data store 330. In other words, in this example, the customer may already have archive data stored in the archival data store 330. The archive data package may include data blocks and key block data. In a third action, the computing instance 320 may receive updated data blocks and updated key block data (i.e., the data that has not been accessed for the defined period of time) from the source data store 310. The updated data blocks and the updated key block data may be associated with updated records that are stored in the source data store 310. For example, the updated records may include a plurality of updated key-value pairs. Keys in the updated key-value pairs may correspond to the updated key block data, and values in the updated key-value pairs may correspond to the updated data blocks.

In a fourth action, the computing instance 320 may merge the data blocks with the updated data blocks to create merged data blocks in memory of the computing instance. In a fifth action, the computing instance 320 may send the merged data blocks to the archival data store 330. The merged data blocks may be created in parallel with the merged data blocks being sent to the archival data store 330 in order to utilize compute power and network bandwidth at a same time. In one particular example, the computing instance 320 may send the merged data blocks as a data stream to the archival data store 330. In a sixth action, the computing instance 320 may compute merged key block data and header information while the merged data blocks are being sent to the archival data store 330. For example, the computing instance 320 may compute the merged key block data by merging the key block data with the updated key block data, and the computing instance 320 may compute the header information based on the merged data blocks.

In a seventh action, the computing instance 320 may send the merged key block data and the header information to the archival data store 330. In an eight action, the merged data blocks, the merged key block data and the header information may form the updated archive data package that is stored at the archival data store 330.

Figure 4:
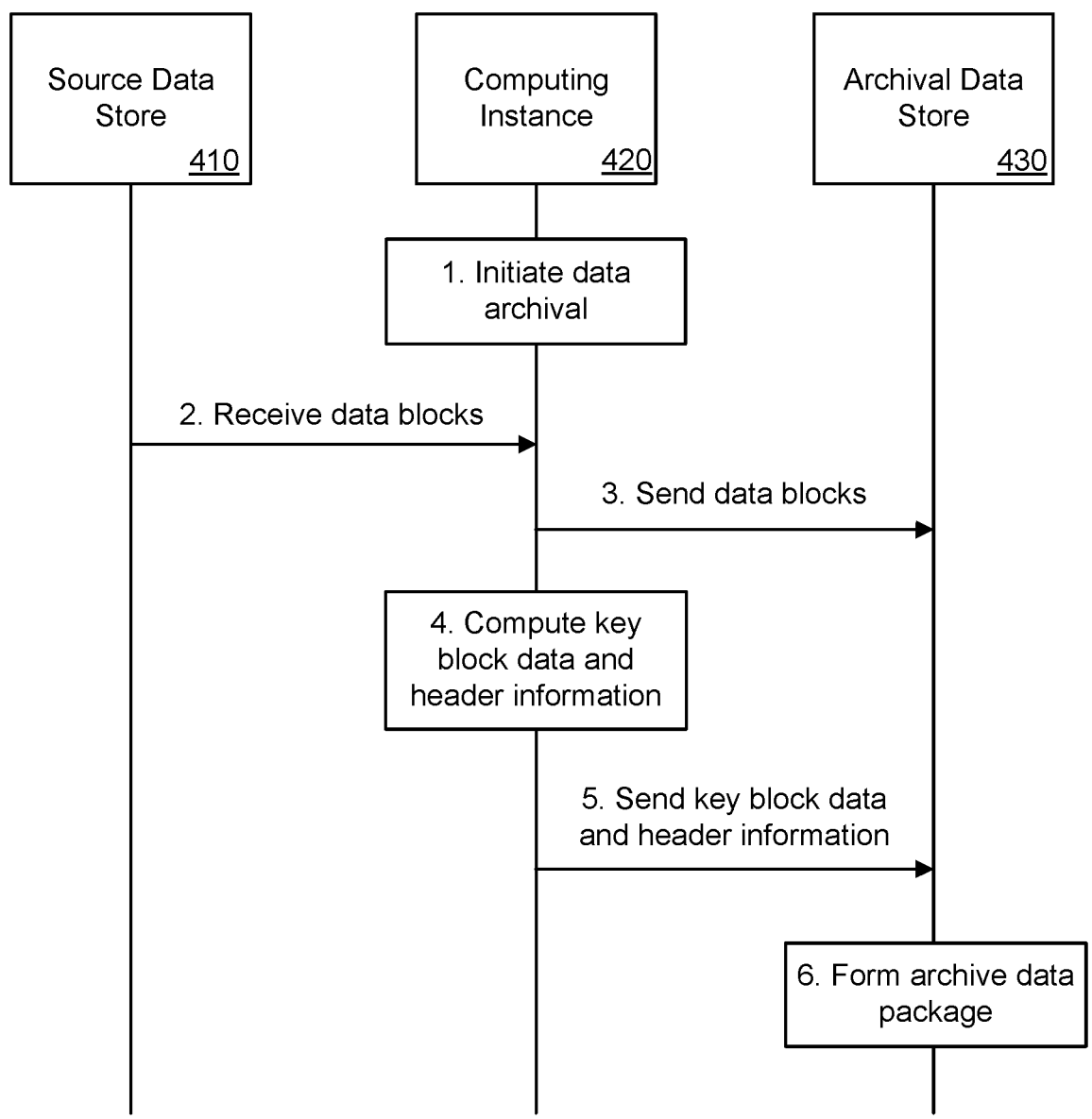
FIG. 4 illustrates operations for generating an archive data package in a service provider environment according to an example of the present technology.

FIG. 4 illustrates an example of operations for generating an archive data package in a service provider environment. The archive data package may be generated using a computing instance 420 running in a service provider environment. In a first action, the computing instance 420 may initiate a data archive process. For example, the computing instance 420 may detect that data stored for a customer in a source data store 410 (e.g., a low latency, high cost data store) has not been accessed for a defined period of time (e.g., 30 days), and thereby, that data is to be moved to an archival data store 430 (e.g., a high latency, low cost data store).

In a second action, the computing instance 420 may receive data blocks and key block data (i.e., the data that has not been accessed for the defined period of time) from the source data store 410. In a third action, the computing instance 420 may begin to send the data blocks to the archival data store 430. In one particular example, the computing instance 420 may send the data blocks as a data stream to the archival data store 430. In a fourth action, the computing instance 420 may compute key block data and header information while the data blocks are being received and sent to the archival data store 430. The data blocks and the key block data may be associated with records that are stored in the source data store 410. For example, the records may each include a key-value pair. Keys in the key-value pairs may correspond to the key block data, and values in the key-value pairs may correspond to the data blocks. In a fifth action, the computing instance 420 may send the key block data and the header information to the archival data store 430. In a sixth action, the data blocks, the key block data and the header information may form the archive data package that is stored at the archival data store 430.

Figure 5:
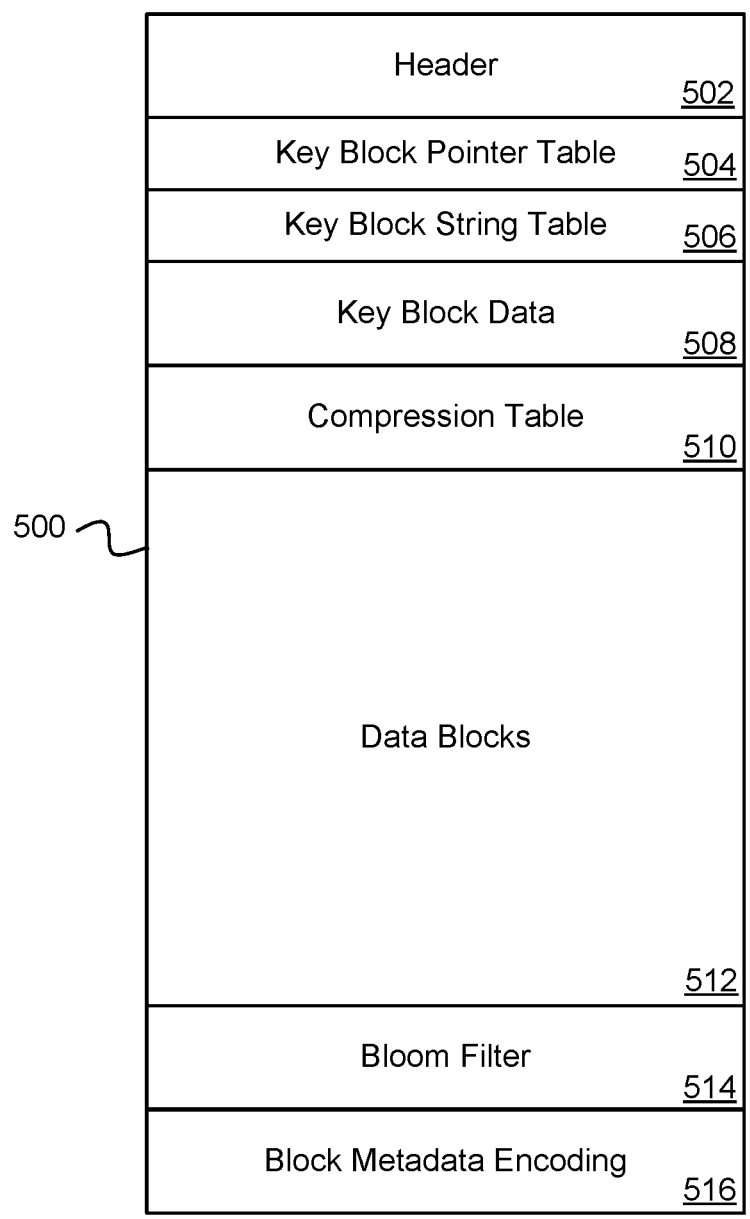
FIG. 5 illustrates a data archive format of an archive data package according to an example of the present technology.

FIG. 5 illustrates an example of a data archive format 500 of an archive data package. The archive data package may include a header 502 in accordance with the data archive format 500 (or compute efficient data archive format). The header 502 may include offset and length information for the regions in the archive data package (e.g., key block data 508 and data blocks 512). The header 502 may be generated after the regions or information blocks in the archive data package are populated. The archive data package may include a key block pointer table 504, a key block string table 506 and the key block data 508 in accordance with the data archive format 500. The archive data package may include a compression table 510 and the data blocks 512 in accordance with the data archive format 500. In one example, the data blocks 512 may be approximately 90-99% of a file size of the archive data package. In addition, the archive data package may include a Bloom filter 514 and/or block metadata encoding 516 in accordance with the data archive format 500.

This data archive format 500 of the archive data package may prevent the data blocks 512 in the archive data package from being separately transmitted from a computing instance to a data store. For example, in the data archive format 500, the data blocks 512 are located at a last part of the archive data package prior to the Bloom filter 514 and block metadata encoding 516. As a result, the data blocks 512 may be unable to be transmitted from the computing instance to the data store while the data blocks 512 are being generated at the computing instance because the key blocks are completely generated and stored first. In other words, the data archive format 500 of the archive data package may necessitate that the archive data package be transmitted as a single file from the computing instance to the data store.

Figure 6:
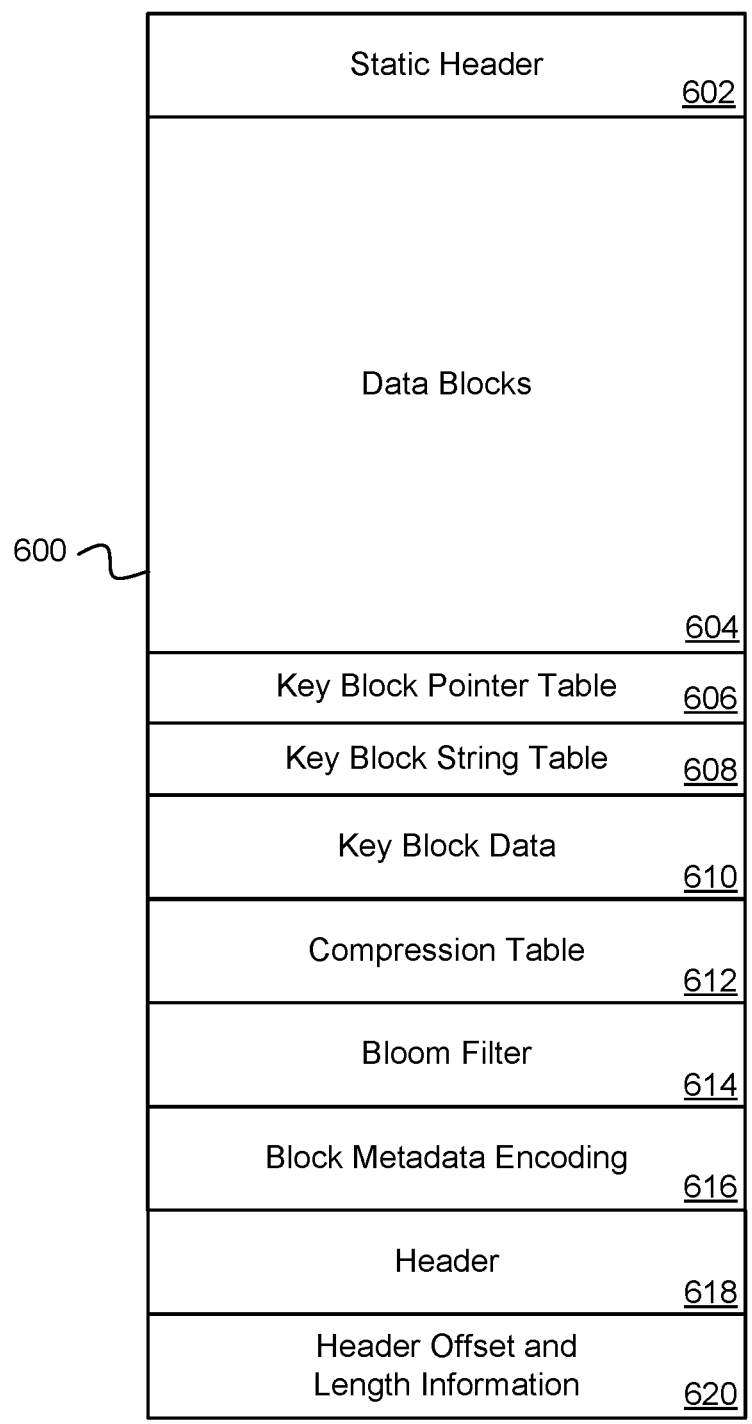
FIG. 6 illustrates another data archive format of an archive data package according to an example of the present technology.

FIG. 6 illustrates an example of a data archive format 600 of an archive data package. The archive data package may include a static header 602 in accordance with the data archive format 600. The static header 602 may include an indication that a header 618 is located at an end of the archive data package in accordance with the data archive format 600. The archive data package may include data blocks 604 in accordance with the data archive format 600. The data blocks 604 may be separately transmitted from a computing instance to a data store without being written to a local hard disk of the computing instance due, in part, to the static header 602 included at a beginning of the archive data package. The archive data package may include a key block pointer table 606, a key block string table 608 and key block data 610 in accordance with the data archive format 600. The key block pointer table 606, the key block string table 608 and/or the key block data 610 may be determined based on the data blocks 604 that are transmitted to the data store. In other words, the key block pointer table 606, the key block string table 608 and/or the key block data 610 may be computed while the data blocks 604 are being generated and transmitted to the data store. In addition, the archive data package may include a compression table 612, a Bloom filter 614 and/or block metadata encoding 618 in accordance with the data archive format 600.

The archive data package may include the header 618 in accordance with the data archive format 600, and the header 618 may include offset and length information for regions in the archive data package, which may enable a library to read the archive data package. The header 618 may be computed after the data blocks 604 are generated and transmitted to the data store. In addition, the archive data package may include header offset and length information 620 at an end of the archive data package in accordance with the data archive format 600. The header offset and length information 620 may indicate an exact offset of the header 618 to the library in order to enable reading of the archive data package. For example, the header offset and length information 620 may include two 8-byte long integers which indicate the offset and a size of the header 618 within the archive data package.

In one example, the data archive format 600 of the archive data package may enable the data blocks 604 in the archive data package to be separately transmitted from the computing instance to the data store (e.g., as a data stream), unlike the data archive format 500 shown in FIG. 5. For example, the data blocks 604 may be transmitted after the static header 602 is transmitted in accordance with the data archive format 600. The data blocks 604 may be transmitted from the computing instance to the data store while the data blocks 604 are being received and/or generated at the computing instance. Since the data blocks 604 may be approximately 90-99% of a file size of the archive data package, a significant amount of total processing time may be saved by parallelizing the generation of the data blocks 604 with the transmission of the data blocks 604.

In one example, after the data blocks 604 are transmitted to the data store, the key block pointer table 606, the key block string table 608, the key block data 610, the compression table 612, the Bloom filter 614, the block metadata encoding 618 and/or the header offset and length information 620 may be transmitted from the computing instance to the data store, either separately or as a single file. The key block pointer table 606, the key block string table 608, the key block data 610, the compression table 612, the Bloom filter 614, the block metadata encoding 618 and/or the header offset and length information 620 may be stored in the local hard disk or another mass storage device of the computing instance during generation and transmission of the data blocks 604.

In the example shown in FIG. 6, the data blocks 604 may correspond to a region of continuous blocks of data, and the key block data 610 may correspond to a region of continuous blocks of the keys. In another example, the data blocks 604 and the key block data 610 may be stored alternatively, such that both data blocks 604 and key block data 610 may be transmitted from the computing instance to the data store during the generation of the data blocks 604 and the key block data 610.

Figure 7:
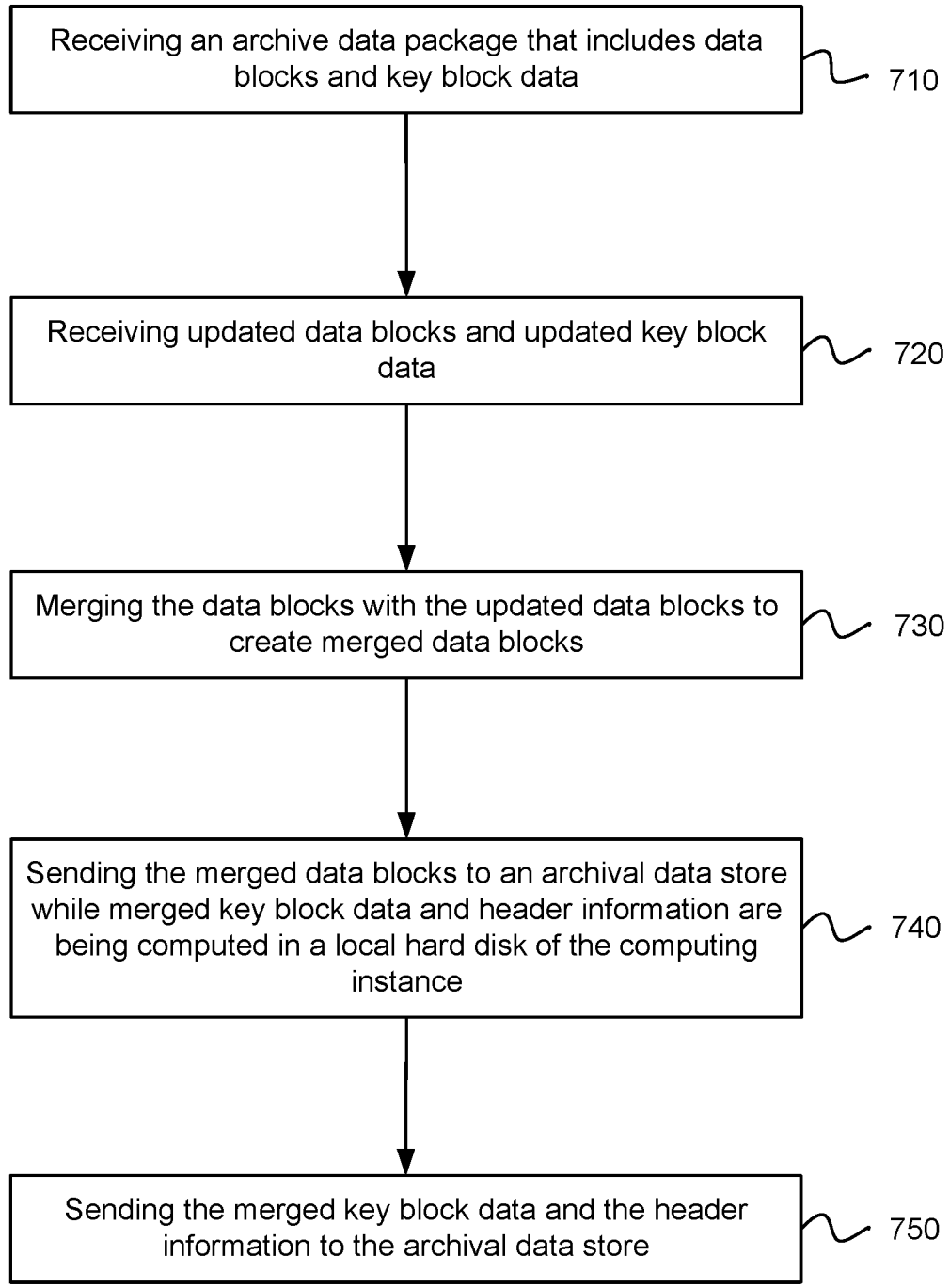
FIG. 7 is a flowchart of an example method for providing an updated archive data package in a service provider environment.

FIG. 7 illustrates an example of a method for providing an updated archive data package in a service provider environment. An archive data package may be received from an archival data store in the service provider environment, as in block 710. The archive data package may be received at a computing instance running in the service provider environment. The archive data package may be received when a data archive process is initiated using the computing instance. The archive data package may be stored in a local hard disk of the computing instance, and the archive data package may include data blocks and key block data. In addition, the archival data store may be characterized by a first latency.

Updated data blocks and updated key block data may be received at the computing instance from a source data store in the service provider environment, as in block 720. The updated data blocks and the updated key block data may be associated with updated records that are stored in the source data store. For example, the updated records may include a plurality of updated key-value pairs. Keys in the updated key-value pairs may correspond to the updated key block data, and values in the updated key-value pairs may correspond to the updated data blocks. The source data store may be characterized by a second latency, and the second latency of the source data store may be less than the first latency of the archival data store. The updated data blocks and the updated key block data may be an update of some or all of the data blocks and the key block data included in the archive data package.

The data blocks may be merged with the updated data blocks to create merged data blocks, as in block 730. The data blocks and the updated data blocks may be merged to create the merged data blocks using the computing instance in the service provider environment.

The merged data blocks may be sent from the computing instance to the archival data store, as in block 740. The merged data blocks may be sent to the archival data store while merged key block data and header information are being computed at the computing instance. For example, the key block data may be merged with the updated key block data to compute the merged key block data, and the header information may be computed based on the merged data blocks. In addition, the merged data blocks may be sent to the archival data store after being stored in volatile memory and without storing the merged data blocks at the local hard disk of the computing instance, thereby reducing a number of read and write operations performed on the local hard disk of the computing instance.

The merged key block data and the header information may be sent from the computing instance to the archival data store, as in block 750. The merged key block data and the header information may be sent to the archival data store after sending the merged data blocks to the first data store. The merged data blocks, the merged key block data and the header information may be included in an updated archive data package that is stored at the archival data store. The updated archive data package may include a plurality of key-value pairs, and keys from the key-value pairs may be included in the merged key block data and values from the key-value may be included in the merged data blocks.

Figure 8:
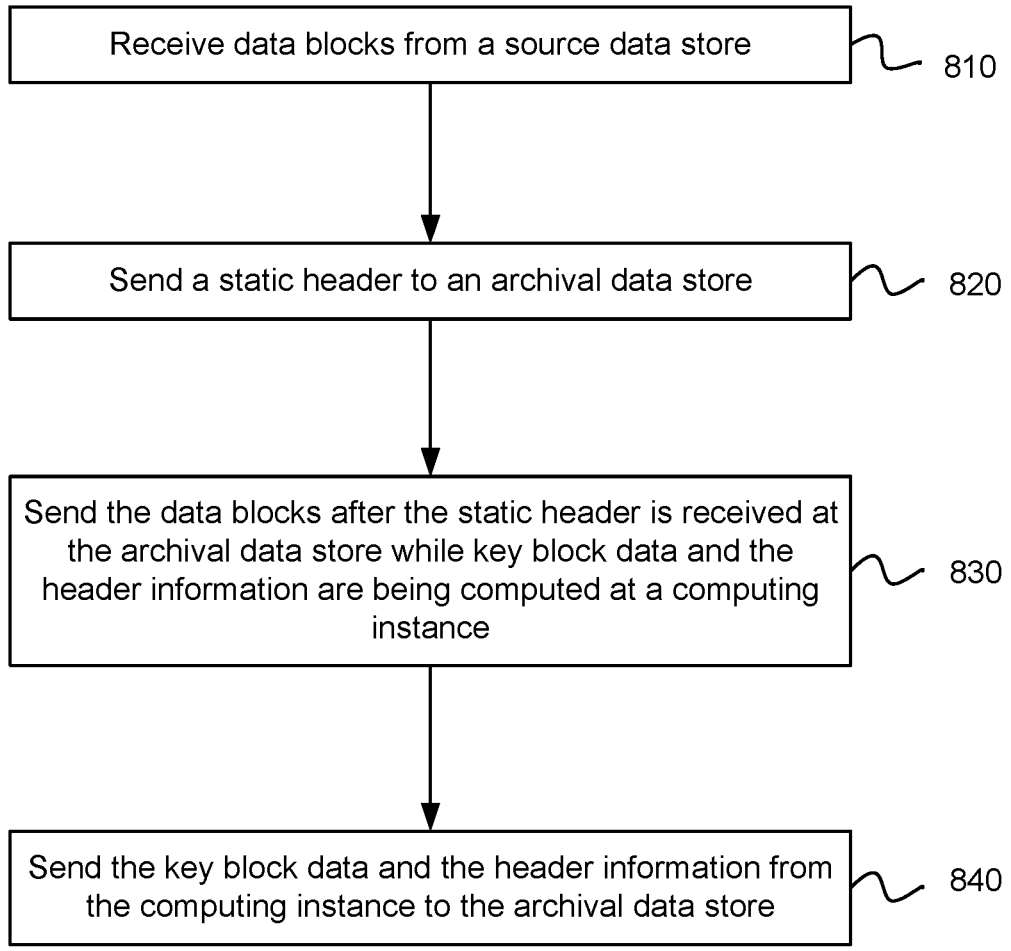
FIG. 8 is a flowchart of an example method for providing an archive data package in a service provider environment.

FIG. 8 illustrates an example of a method for providing an archive data package in a service provider environment. Data blocks may be received from a source data store in the service provider environment, as in block 810. The data blocks may be received at a computing instance running in the service provider environment. The data blocks may be received when a data archive process is initiated using the computing instance. For example, the data blocks may be received from the source data store when a duration of time since the data blocks have been accessed by a customer account exceeds a defined threshold. In addition, the source data store may be associated with a first latency.

A static header may be sent from the computing instance to an archival data store, as in block 820. The static header may include a reference to header information for an archive data package. The static header may enable the data blocks to be transmitted and stored at the archival data store.

The data blocks may be sent from the computing instance to the archival data store, as in block 830. The data blocks may be sent to the archival data store after the static header is received at the archival data store. The archival data store may be associated with a second latency that is greater than the first latency. The data blocks may be sent to the archival data store while key block data and the header information are being computed at the computing instance based on the data blocks received from the source data store. In addition, the data blocks may be sent to the archival data store without storing the data blocks in a local hard disk of the computing instance, thereby reducing a number of read and write operations performed on the local hard disk of the computing instance.

The key block data and the header information may be sent from the computing instance to the archival data store, as in block 840. The key block data and the header information may be sent to the archival data store after sending the data blocks to the archival data store. The data blocks, the key block data and the header information may be included in the archive data package that is stored at the archival data store. The archive data package may include a plurality of key-value pairs, and keys from the key-value pairs may be included in the key block data and values from the key-value may be included in the data blocks.

Figure 9:
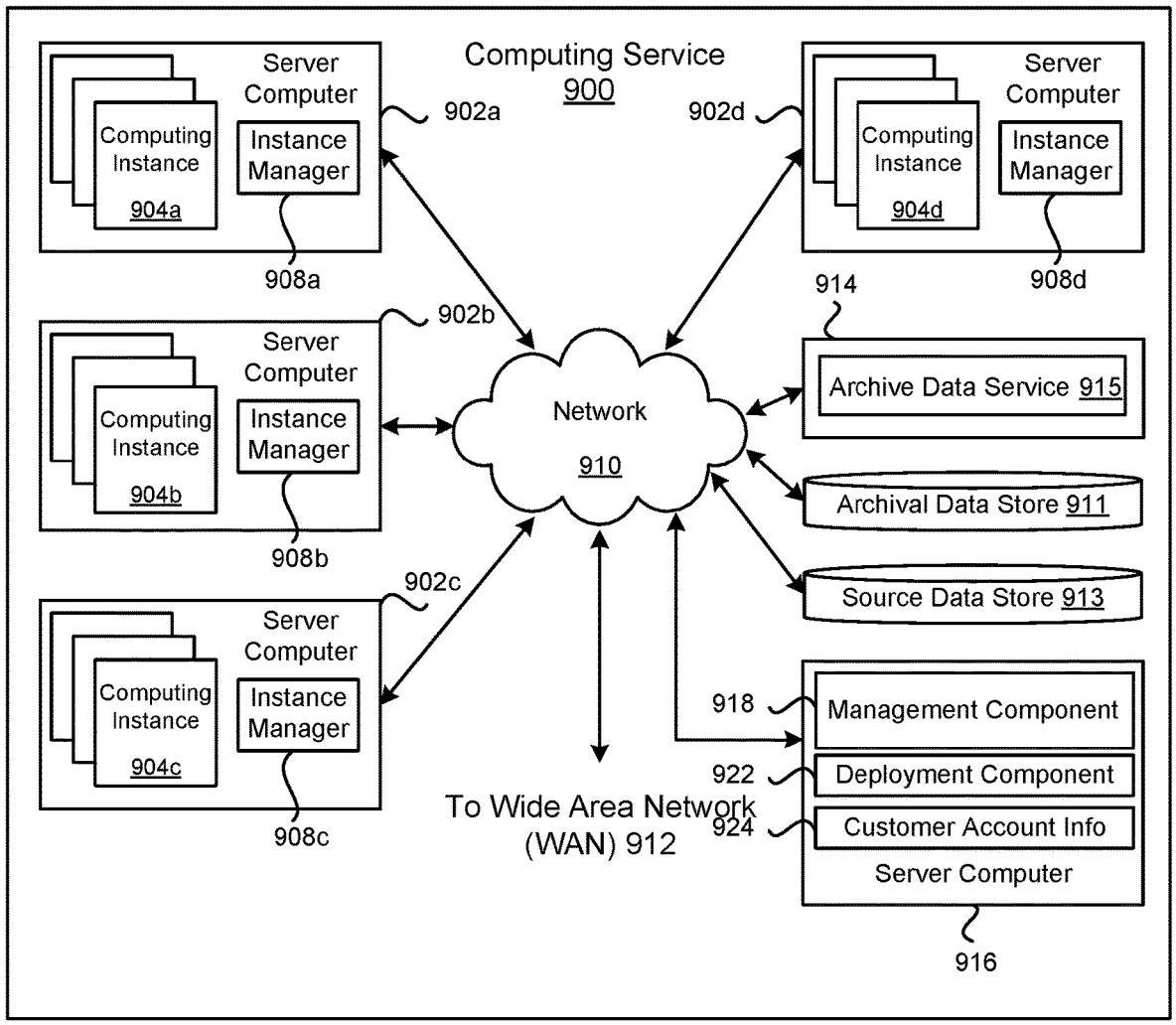
FIG. 9 is a block diagram of a service provider environment according to an example of the present technology.

FIG. 9 is a block diagram illustrating an example computing service 900 that may be used to execute and manage a number of computing instances 904*a-d* upon which the present technology may execute. In particular, the computing service 900 depicted illustrates one environment in which the technology described herein may be used. The computing service 900 may be one type of environment that includes various virtualized service resources that may be used, for instance, to host computing instances 904*a-d*.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A server 914 may be reserved to execute software components for implementing the present technology or managing the operation of the computing service 900 and the computing instances 904a-d. For example, the server 914 may execute an archive data service 915 operable to receive an archive data package from an archival data store 911 in the service provider environment. The archive data package may include data blocks and key block data, and the archival data store 911 may be associated with a first latency. The archive data service 915 may receive updated data blocks and updated key block data from a source data store 913 in the service provider environment, and the source data store 913 may be associated with a second latency that is less than the first latency. The archive data service 915 may merge the data blocks with the updated data blocks to create merged data blocks. The archive data service 915 may send the merged data blocks to the archival data store 911 while merged key block data and header information are being computed. The key block data may be merged with the updated key block data to compute the merged key block data, and the header information may be computed based on the merged data blocks. The archive data service 915 may send the merged key block data and the header information to the archival data store 911. The merged data blocks, the merged key block data and the header information may be included in an updated archive data package that is stored at the archival data store 911.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
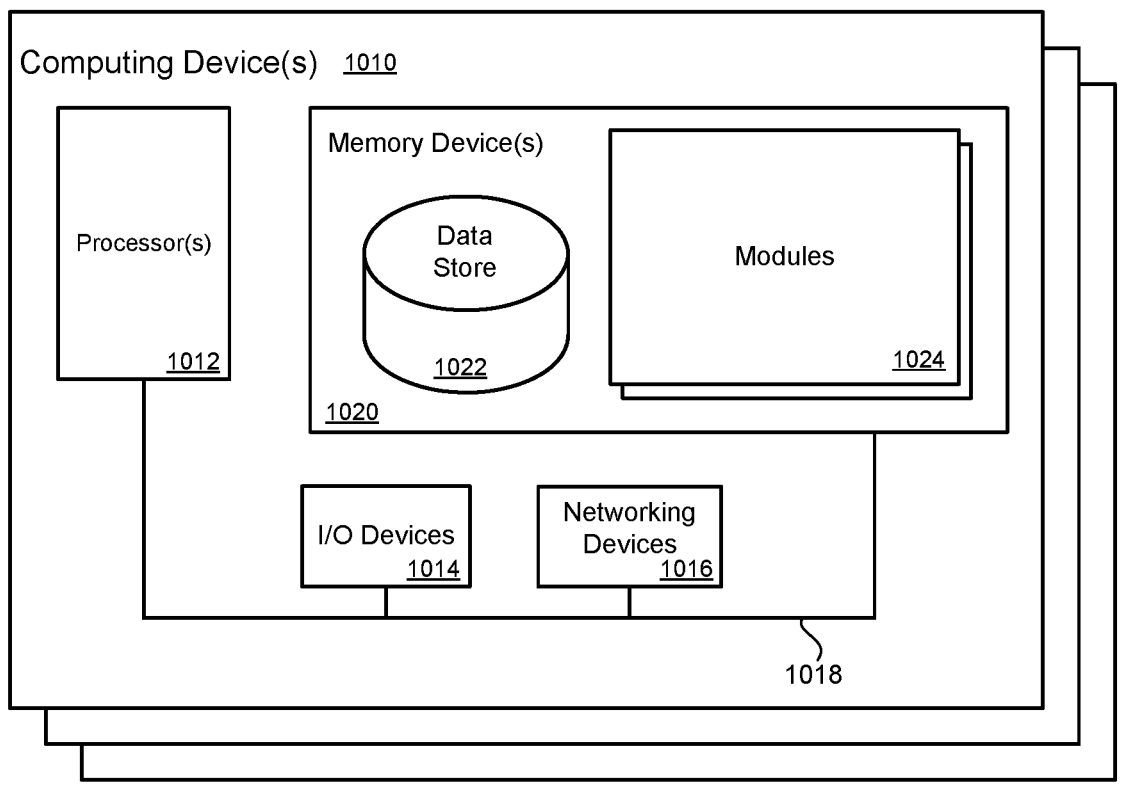
FIG. 10 is a block diagram that provides an example illustration of a computing device that may be employed in the present technology.

FIG. 10 illustrates a computing device 1010 on which modules of this technology may execute. A computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions being executed by one or more processors, comprising:
    receiving, at a computing instance running in a service provider environment, an archive data package from an archival data store in the service provider environment, wherein the archive data package includes data blocks and key block data;
    receiving, at the computing instance, updated data blocks and updated key block data from a source data store in the service provider environment, wherein the archival data store is characterized by a first latency, and the source data store is characterized by a second latency that is less than the first latency;
    merging, at the computing instance, the data blocks with the updated data blocks to create merged data blocks;
    sending the merged data blocks from the computing instance to the archival data store while merged key block data and header information are being computed in a local hard disk of the computing instance, wherein the key block data is merged with the updated key block data to compute the merged key block data, and the header information is computed based on the merged data blocks; and
    sending the merged key block data and the header information from the computing instance to the archival data store, wherein the merged data blocks, the merged key block data and the header information are included in an updated archive data package that is stored at the archival data store.

2. The non-transitory machine readable storage medium of claim 1, further comprising sending the merged data blocks from the computing instance to the archival data store without storing the merged data blocks at the local hard disk of the computing instance, thereby reducing a number of read and write operations performed on the local hard disk of the computing instance.

3. The non-transitory machine readable storage medium of claim 1, further comprising:
    storing the archive data package received from the archival data store in the local hard disk of the computing instance;
    storing the merged key block data and the header information in the local hard disk of the computing instance; and
    sending the merged key block data and the header information to the archival data store after sending the merged data blocks to the archival data store.

4. The non-transitory machine readable storage medium of claim 1, wherein the updated archive data package includes a plurality of key-value pairs, and keys from the key-value pairs are included in the merged key block data and values from the key-value pairs are included in the merged data blocks.

5. A method, comprising:
    receiving, at a computing instance running in a service provider environment, a first archive data package from an archival data store in the service provider environment, wherein the archival archive data package includes first data blocks and first key block data;
    receiving, at the computing instance running in the service provider environment, second data blocks and second key block data from a source data store in the service provider environment;
    creating merged data blocks by combining the first data blocks with the second data blocks; and
    sending the merged data blocks to the archival data store while merged key block data is being created by combining the first key block data with the second key block data, wherein the merged data blocks and the merged key block data are included in a second archive data package that is stored at the archival data store, and the second archive data package is an update of the first archive data package.

6. The method of claim 5, further comprising:
    storing the first archive data package in a local hard disk of the computing instance after the first archive data package is received from the archival data store; and
    sending the merged data blocks from the computing instance to the archival data store without storing the merged data blocks in the local hard disk of the computing instance, thereby reducing a number of read and write operations performed on the local hard disk of the computing instance.

7. The method of claim 5, further comprising:
    storing the merged key block data in a local hard disk of the computing instance; and
    sending the merged key block data to the archival data store after sending the merged data blocks to the archival data store.

8. The method of claim 5, wherein the second archive data package includes:
    a static header that includes a file size for the second archive data package and a reference to header information for the second archive data package;
    the merged data blocks;
    the merged key block data;
    additional key information that includes a key block pointer table and a key block string table; and
    the header information that includes offset information for the merged data blocks.

9. The method of claim 8, further comprising sending the static header from the computing instance to the archival data store prior to sending the merged data blocks from the computing instance to the archival data store to enable the merged data blocks to be stored by the archival data store.

10. The method of claim 5, wherein the second archive data package includes a plurality of key-value pairs, and keys from the key-value pairs are included in the merged key block data and values from the key-value pairs are included in the merged data blocks.

11. The method of claim 5, further comprising combining the first data blocks with the second data blocks which includes updating previous values and adding new values for inclusion in the second archive data package.

12. The method of claim 5, further comprising combining the first key block data with the second key block data which includes updating previous keys and adding new keys for inclusion in the second archive data package.

13. The method of claim 5, further comprising receiving the first archive data package that includes the first data blocks from the archival data store while merging the first data blocks with the second data blocks to create the merged data blocks.

14. The method of claim 5, further comprising receiving the second data blocks and the second key block data from the source data store when a duration of time since the second data blocks have been accessed by a customer account exceeds a defined threshold.

15. The method of claim 5, further comprising creating the merged data blocks in parallel with sending the merged data blocks in order to utilize compute power at the computing instance and network bandwidth at a same time, and reduce an amount of time to create the second archive data package.

16. The method of claim 5, wherein the archival data store is associated with a first latency, and the source data store is associated with a second latency that is less than the first latency.

17. A system, comprising:
at least one processor;
at least one memory device including a data store to store a plurality of data and instructions that, when executed, cause the system to:
receive, at a computing instance running in a service provider environment, data blocks from a source data store in the service provider environment;
send a static header from the computing instance to an archival data store, wherein the static header includes a reference to header information for an archive data package;
send the data blocks from the computing instance to the archival data store after the static header is received at the archival data store while key block data and the header information are being computed at the computing instance based on the data blocks received from the source data store; and
send the key block data and the header information from the computing instance to the archival data store, wherein the data blocks, the key block data and the header information are included in the archive data package that is stored at the archival data store.

18. The system of claim 17, wherein the plurality of data and instructions, when executed, cause the system to:
receive the archive data package from the archival data store;
store the archive data package in a local hard disk of the computing instance;
receive updated data blocks and updated key block data from the source data store;
merge the updated data blocks with the data blocks included in the archive data package to create merged data blocks;
send the merged data blocks from the computing instance to the archival data store while merged key block data is being computed at the computing instance, wherein the key block data is merged with the updated key block data to compute the merged key block data, and the merged data blocks and the merged key block data are included in an updated archive data package that is stored at the archival data store.

19. The system of claim 17, wherein the plurality of data and instructions, when executed, cause the system to: send the data blocks from the computing instance to the archival data store without storing the data blocks in a local hard disk of the computing instance, thereby reducing a number of read and write operations performed on the local hard disk of the computing instance.

20. The system of claim 17, wherein the plurality of data and instructions, when executed, cause the system to: receive the data blocks from the source data store when a duration of time since the data blocks have been accessed by a customer account exceeds a defined threshold.

* * * * *